Nov. 27, 1956  L. F. THIRY  2,772,104
ELASTIC ARTICULATING DEVICE
Filed April 3, 1953  3 Sheets-Sheet 1

INVENTOR.
LEON F. THIRY
BY Fay & Fay
ATTORNEYS

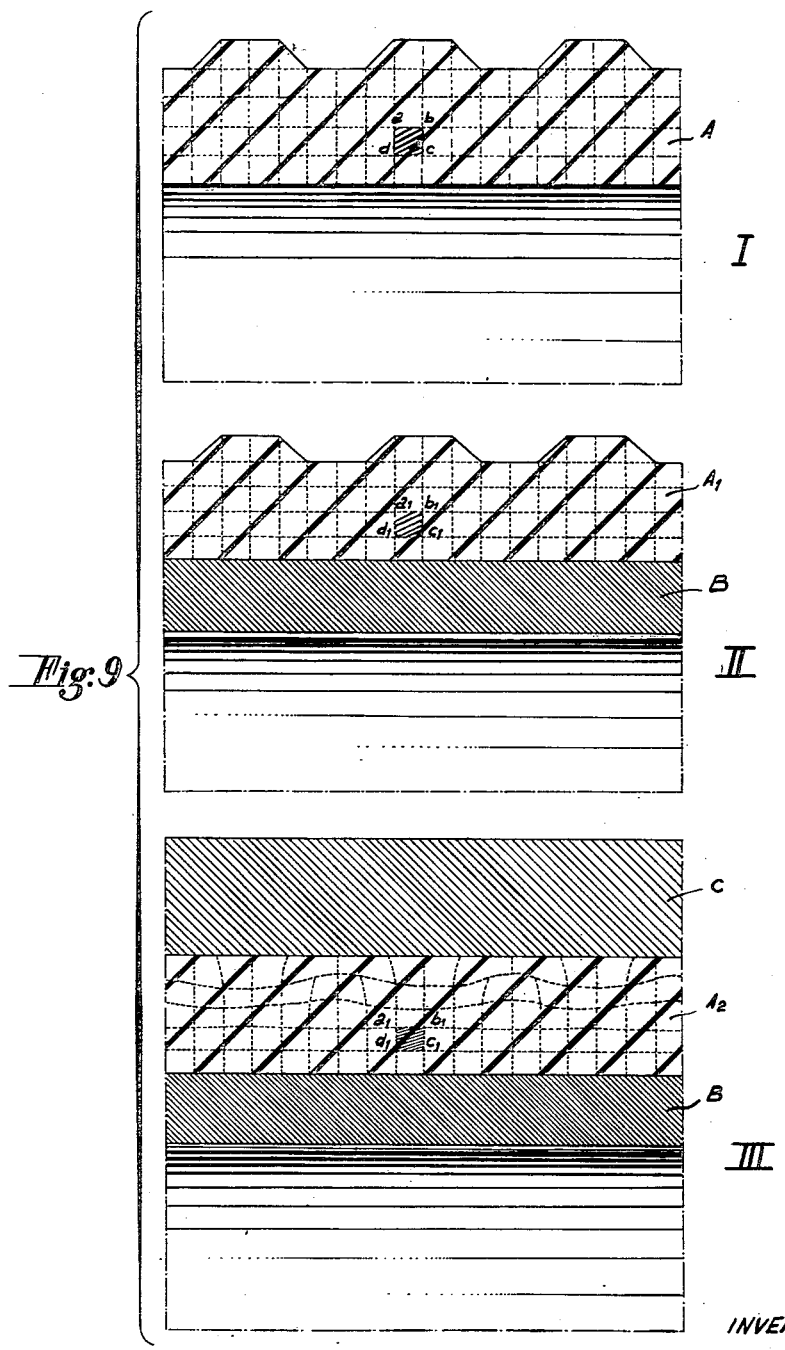

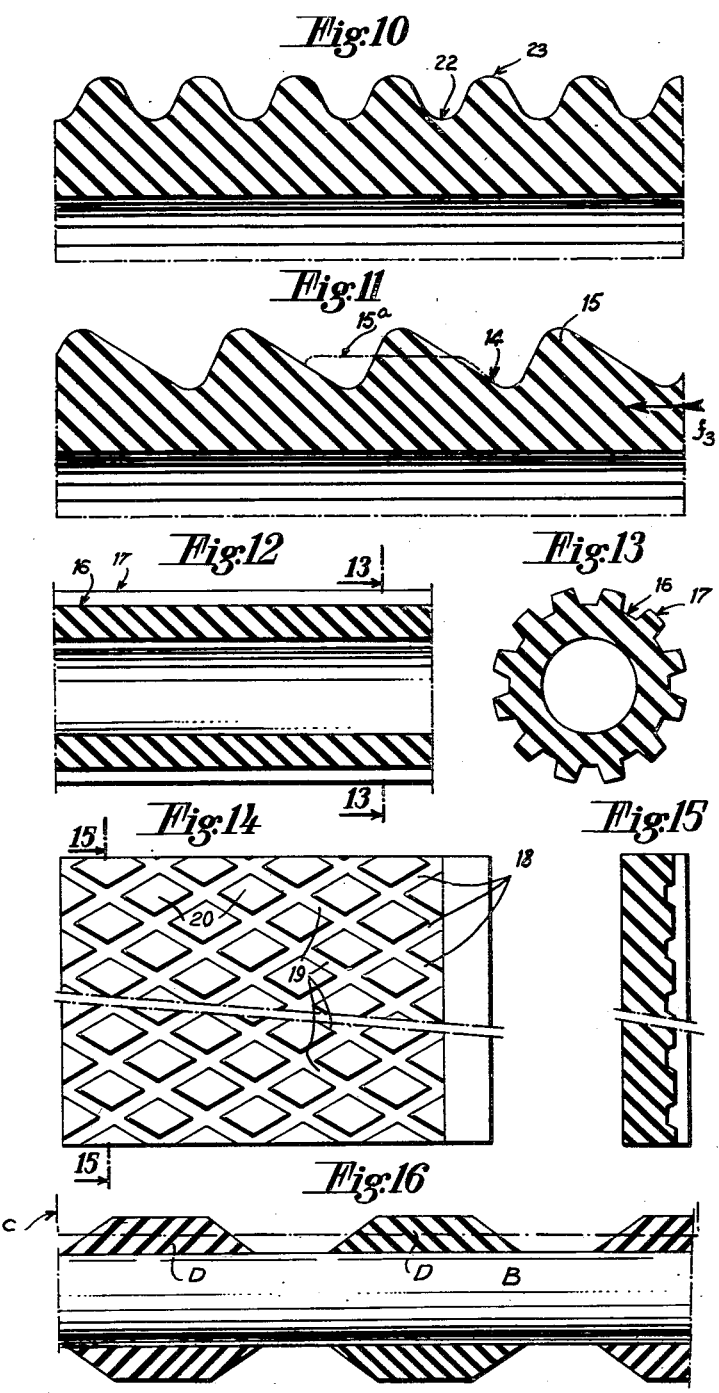

United States Patent Office 2,772,104
Patented Nov. 27, 1956

2,772,104

ELASTIC ARTICULATING DEVICE

Leon F. Thiry, Chagrin Falls, Ohio

Application April 3, 1953, Serial No. 346,558

Claims priority, application France April 3, 1952

4 Claims. (Cl. 287—85)

The present invention relates to elastic articulating devices, intended to allow relative oscillatory movement of two parts, and is of the type in which a tubular component of rubber or analogous elastic material is deformed in substantial fashion between two coaxial cylindrical surfaces, in such manner as to permit, through its molecular movements and without surface sliding, relative displacements of those surfaces, especially those of oscillation about their common axis.

More particularly, the invention relates to articulating devices of the type which should have relatively greater length in relation to their diameters and such that, without encountering great difficulties, one cannot think of driving directly into the bore of the external component of the articulation a rubber sleeve with surfaces internally and externally smooth, having this relatively large length previously mounted upon the internal component and whose (the sleeve's) external diameter is therefore greater than that of said bore. As the rubber should indeed lengthen throughout its mass in order to reach its extremities with the purpose of expanding there in the form of flanges, the resistance offered by the sleeve would be practically insurmountable without the employment of absolutely prohibitive efforts and/or of very great assembly speeds, requiring special machines. Moreover, the various components should be manufactured with much reduced tolerances.

Other solutions must then be adopted in the case of such articulations of relatively great axial length.

A known solution consists of manufacturing such an articulating device by first vulcanizing separated rubber collars or rings of reduced or limited length around the external surface of the internal component of the articulation, such as an internal tube on a solid pin. These rubber rings generally have conical extremities and are also generally spaced apart from one another.

The ensemble formed by the internal component and by these rubber rings is then forced into the bore of the external component (tube, support, framework, or other component of a machine). The reduction of the external diameter of the rings is progressively assured by a truncated conical funnel or similar means, such as a round-off or a chamfer secured upon one of the lateral faces of the external component, and this is done in the presence of a suitable lubricant.

The stresses created by this forcing operation compress the rubber rings resting upon the internal component, which produces in these rings axial elongations and various deformations, as well as forces of reaction against the walls of the external and internal components, thus assuring adherence to the first, and increased adherence to the second. There is thus obtained an articulating device capable of undergoing, without appreciable surface friction, elastic deformation which may be either circular, axial, or conical, etc.

In this known solution, the rubber or other elastic substance is subjected to important deformation throughout its entire mass, but with very variable rate in accordance with the points considered.

The present invention has the object of correcting these inconveniences and of obtaining arrangements offering, for identical dimensions, characteristics which are much more uniform and thanks to which the elastic material behaves in a manner incomparably more rational, and allows much greater relative oscillations between internal and external components; this is accomplished without requiring vulcanization of elastic rings to the internal component, at the same time reducing the number of elastic elements to a single one if desired, whatever the final length of the articulating device, and also not necessitating in any way reduced tolerances of manufacture of the components.

The invention has as its object, in the quality of new industrial products:

A cylindrical sleeve of an elastic material such as rubber, whose external surface carries along its entire length corrugations formed by a series of projections and hollows;

The ensemble formed by a rotating internal axial component and by the above sleeve mounted upon this component, the external surface diameter of which is in each transverse plane greater than the corresponding diameter of the axial bore of the sleeve in the free state, so that this sleeve is circumferentially enlarged upon this internal component to which it adheres by the sole means of its circumferential tension, the radial thickness of said sleeve in each of the planes being less than the corresponding thickness in the free state, whereas the length of the sleeve mounted upon the internal component is very substantially equal to that of said sleeve in the free state, any arbitrary square taken in a radially longitudinal plane finding itself (with the sleeve in position) flattened in the form of a rectangle whose length is substantially equal to the side of said square;

And an articulating device in which the above ensemble is housed in the cavity of an external component, the radius in each transverse plane of said cavity being included between the radius presented in the same plane by the sleeve to the right of a projection and the radius at the bottom of a cavity of the external surface, in such manner that the projections or flanges of the sleeve are radially compressed and laterally expanded into the adjacent cavities, which they fill at least partially.

This device, in which the elastic sleeve adheres to two concentric surfaces between which it is pressed solely by its deformation, without vulcanization or cementing, is very simply installed regardless of its length, because the elastic material of the projections immediately takes up room in the adjacent cavities.

Besides, these ridges (projections) and hollows taking up but a fraction of the radial thickness of the sleeve— a fraction that will generally be slight—the solid part of this sleeve will undergo no deformation other than the above-mentioned flattening which is perfectly known when the various diameters have been determined, and permitting, as is already known, large relative oscillations between the two components and offering particularly effective resistance to high radial loads. The arbitrary character of the flattening, therefore, has only a negligible influence upon the behavior of the sleeve ensemble. In other terms and in more explicit fashion, there may be discovered in this device (whose length may be as great as desired), all of the qualities, notably of uniformity in the characteristics of one article to another, of great potential amplitude of relative oscillation of the internal and external components, and of resistance to radial loads of well-known devices of short length, in which an elastic ring or collar with smooth internal and external surfaces is radially compressed and axially elongated in substantial proportions between two concentric surfaces, and this very important result is obtained thanks to peripheral ridges and hollows without prohibitive manufacturing and installation difficulties which those well-known devices of short length would offer in the case of the great lengths considered here.

Other characteristics will appear from the description which follows.

In the attached drawing, given solely by way of example:

Fig. 9 is a diagram showing, in schematic radial longitudinal section II and III, the deformations assumed by the supposed theoretical squares traced (in I) on the sleeve in the free state when this sleeve is expanded circumferentially on the internal component and compressed between the internal and external components, respectively;

Figs. 10 and 11 are radial longitudinal sections of variations of elastic sleeves, in accordance with the invention;

Fig. 12 is a diametric longitudinal section of another variation;

Fig. 13 is a transverse section according to line 13—13 of Fig. 12;

Fig. 14 represents the partial development, flatwise, of another sleeve whose external surface carries two series of interlacing helicoidal grooves;

Fig. 15 is a corresponding transverse section, in accordance with line 15—15 of Fig. 14;

Fig. 16 is a diametric longitudinal section of the known device with separated rings which are cemented or vulcanized upon the internal component, and to which allusion has been made in the introduction.

Figure 1:
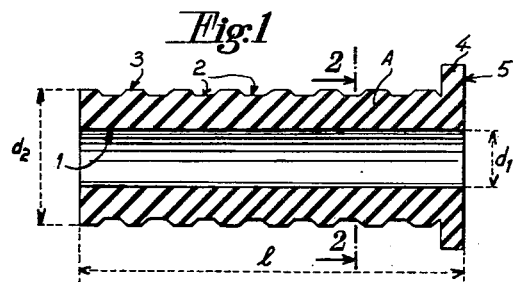
Fig. 1 is a longitudinal diametric section of an elastic sleeve, perfected in accordance with the invention and represented in the free state.
Figure 2:
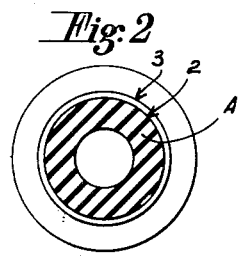
Fig. 2 is a transverse section of it, in accordance with line 2—2 of Fig. 1.
Figure 3:
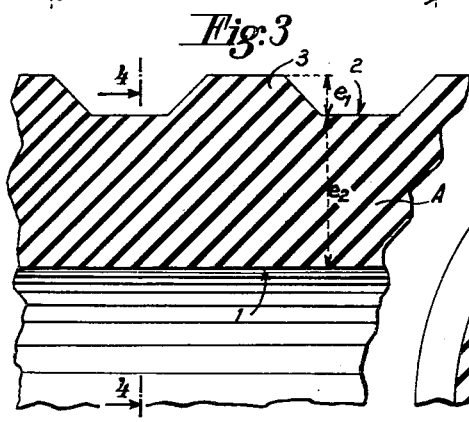
Fig. 3 is a partially longitudinal section on a radial plane of larger scale.
Figure 4:
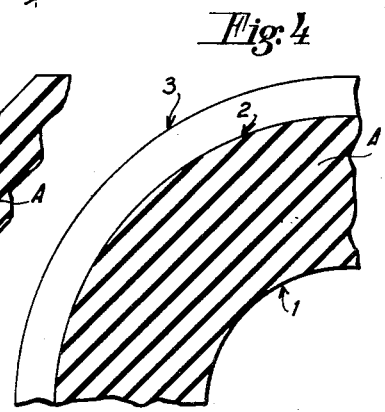
Fig. 4 is a corresponding traverse section, according to line 4—4 of Fig. 3.
Figure 5:
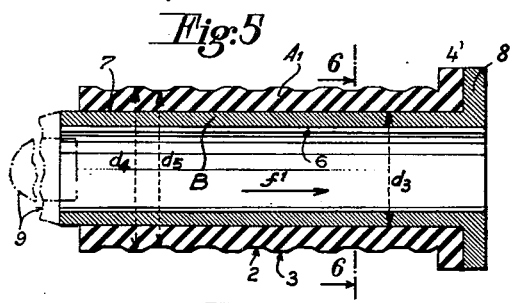
Fig. 5 is a diametric longitudinal section of the ensemble formed by a tubular component and by the sleeve of the preceding figures, mounted on that component on which it is extended by means of circumferential elongation.
Figure 6:
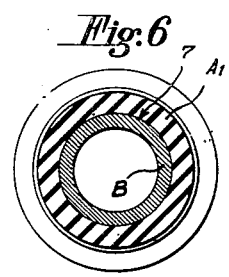
Fig. 6 is a transverse section in accordance with line 6—6 of Fig. 5.
Figure 7:
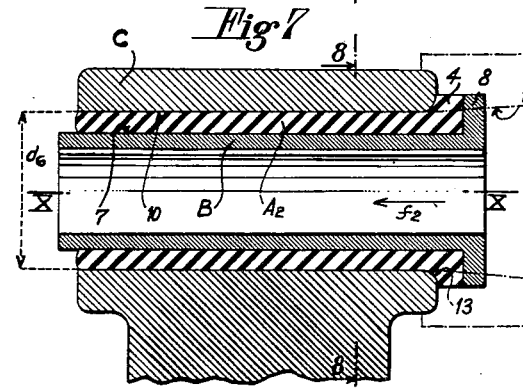
Fig. 7 represents, in longitudinal section, an articulating device formed by the ensemble of Figs. 5 and 6, engaged in the cylindrical bore of an external component.
Figure 8:
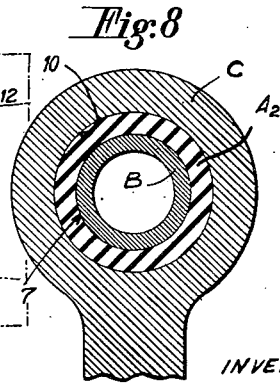
Fig. 8 is a transverse section, according to line 8—8 of Fig. 7.

According to the embodiments represented in Figs. 1 through 9, the invention comprises (a) the elastic sleeve A, represented in Figs. 1 through 4, in the free state;

(b) the ensemble represented in Figs. 5 and 6, and formed by an internal component B and by this sleeve, extended circumferentially (in $A_1$) upon this component B;

(c) the elastic articulating device represented in Figs. 7 and 8, and in which the above ensemble is housed in an external component C, the sleeve which has taken the form $A_2$ being at the same time extended circumferentially upon the internal component B and compressed radially into the external component C.

It is self-evident that the final commercial product is the device of Figs. 7 and 8, the sleeve of Figs. 1 through 4, and the ensemble of Figs. 5 and 6 representing only intermediate industrial products.

More detail will now be given about these various products, setting forth at the same time the method for passing from one to the other.

The sleeve A of Figs. 1–4 is composed of a cylindrical tubular component of rubber or analogous elastic material. Its internal surface 1 is smooth and cylindrical, its transverse section is circular and its diameter $d_1$ is constant along the entire length 1 of the sleeve. Its external surface, on the contrary, is not smooth; it carries hollows 2 composed of grooves or circumferential transverse channels which allow to be present on the external surface of diameter $d_2$ only spaced or separated ridges 3, forming circumferential projections or flanges separated by the grooves.

Preferably and as may be seen in Figs. 1–4 on a large scale, the transverse sections of the grooves 2 and of the flanges 3—that is, the sections of any radial longitudinal plane—are complementary and trapezoidal, each groove ascending towards the exterior. These grooves 2 have a relatively reduced depth $e_1$, which is generally lower or, at the most, equal to the radial thickness $e_2$, which exists between the bottom of said grooves and the internal surface 1.

The channels 2 and the flanges 3 may be very easily obtained by molding of the sleeve $a$ in a suitable mold.

Eventually and as shown, the sleeve $a$ may carry, at one of its extremities, a cylindrical flange 4 for axial thrust, with an external lateral face 5 that is plane or concave, as known.

This sleeve A is first fitted around the internal component B and takes the form illustrated by reference identification $A_1$ in Figs. 5 and 6. This component, which is tubular in the example shown, its bore 6 allowing eventually the passage of a bolt or other axle, carries an external cylindrical surface 7, whose diameter $d_3$ is greater than $d_1$.

The component B may carry, as shown, a flange 8 at one end of its extremities.

The sleeve A of Figs. 1–4 is secured (at high speeds or otherwise), in the presence of water or other liquid constituting a lubricant, this lubricant being eventually of such a nature that, in drying, it increases the adherence of the rubber to the metallic wall against which it is pressed (according to a well-known technique), to the component B, the circumferential expansion of the sleeve being assured, for example, with the aid of a truncated punch 9 partially represented by broken lines in Fig. 5, and whose small base has a diameter less than $d_1$. The assembly takes place in the direction of the arrow $f_1$.

As a result of its fitting around component B, the sleeve A of Figs. 1–4 takes the form $A_1$, of Figs. 5 and 6. It expands circumferentially, the rate of circular elongation decreasing, as is easily understood, from the internal surface of the sleeve to its external surface. Its internal and external diameters pass from the values $d_1$ and $d_2$ to the high values $d_3$ and $d_4$, respectively, but the radial thickness of the sleeve has decreased because the difference $(d_4 - d_3)$ is smaller than the difference $(d_2 - d_1)$.

After engagement upon the component B, the sleeve continues to carry exteriorly its alternating grooves and flanges, but their transverse sections have decreased as a result of the circumferential elongation of the sleeve. The diameter at the bottom of the grooves has a value $d_5$ of such a sort that $$\frac{d_4 - d_5}{2}$$

is less than the depth $e_1$ presented by the grooves in the free state. The sleeve length has undergone a decrease so slight that it has not been deemed necessary to depict it in the drawing.

One may advantageously refer to Fig. 9, which shows particularly clearly, in a comparison of its diagrams I and II, the deformation undergone by the rubber sleeve between the free state A and the state $A_1$ which results from its installation upon the component B. The radial longitudinal section of the sleeve A (diagram I) has been arbitrarily divided into virtual squares, such as those hatch-marked $abcd$. After deformation, all of the squares have become rectangles ($a_1 b_1 c_1 d_1$), so that the longitudinal side $a^1b^1$ of the rectangle remains practically equal to the side $ab$ of the initial square, whereas the radial side $b^1c^1$ of the rectangle has become definitely less than the value of said side of the square, and is, for example, reduced by 30–60 percent.

Finally, in order to obtain the articulating device represented in Figs. 7 and 8, one must engage (in the direction of the arrow) the ensemble of Figs. 5 and 6 within the cylindrical bore 10 of the external component C; this bore 10, shown in the example, where the axial length of the ridges 3 and the hollows 2 are equal, has a diameter $d_6$ which is included between, on the one hand, the external diameter $d_4$ of the deformed sleeve $A^1$ carried by the internal component B and, on the other hand, the average diameter of the grooves 2 of the sleeve $A^1$.

$$d_4>d_6>d_5$$

The engagement is equally effected in the presence of a suitable lubricant, in accordance with known techniques, whether with the aid of a truncated-cone funnel 12, supported and centered laterally against the external component C and which insures the the necessary radial compression of the sleeve A, or else with the aid of a simple chamfer 13 provided at the entrance of the bore 10. It is not necessary here to employ high speed for this engagement, which may then be carried out by the use of simple equipment (vice, etc.), and may be effected without difficulty by the builder of the machine employing the device, this device having been furnished in its intermediate form of Figs. 5 and 6 by the specialist-supplier.

The elastic sleeve finally assumes the definitive form $A^2$ (Figs. 7 and 8). There has been a levelling of the external surface of the sleeve. Its flanges 3 have been flattened and expanded.

As a result of the radial flattening of the flanges, the sleeve $A^2$ adheres firmly to the internal surface 10 of the external component C, and its adherence to the external surface 7 of the internal component B—an adherence already assured by circumferential expansion of the sleeve from A to $A^1$—is reinforced.

Reference may now be made to diagrams II and III of Fig. 9; it is seen that, by virtue of the engagement with the external component C, the virtual peripheral rectangles have been modified, their sides perpendicular to the longitudinal axis are curved inward toward the transverse plane of symmetry of the grooves, while the sides parallel to the axis have become corrugated, approaching the axis to the right of the flanges and withdrawing, on the contrary, from the right of the grooves. But, the disturbance has not reached the entire mass of rubber, and it can be seen that the rectangle $a^1b^1c^1d^1$ has remained unchanged. (Compare diagrams II and III.)

Attention is called to the fact that these results are easily controlled in practice, by drilling radial holes into the sleeve (A, Fig. 7) and then examining the directions taken by these holes on the sleeve A after a cut through a diametric longitudinal plane.

In summary, it is seen then that the complete articulating device represented in Figs. 7 and 8, which may be of any length and whose installation may, in spite of that, be effected without any difficulty, is related (by the massive portion of its rubber mass) to the known device which carries a rubber ring with smooth internal and external surfaces. Like the latter, it allows large relative oscillations of components B and C around their common axis (XX, Fig. 7) under better conditions than the known device shown in Fig. 16, and which carry on the internal component B separated rings D attached by cementing or by vulcanization to the component B and which the external component C deforms over practically its entire radial thickness.

It is more especially fitting to note that the rough treatment inflicted on the rubber is limited to the peripheral portion of the sleeve, that is, to the part which is generally worked the least in practice, because it is the rubber adjacent to the internal component B which is worked the most; the tangential stresses through surface unity at a given point are actually in inverse ratio to the corresponding radius for an axial load, and in inverse ratio to the square of that radius for the loads which cause the internal component to oscillate about the longitudinal axis (XX) of the device, in relation to the external component.

Finally, it will be noted that, if the sleeve A and the component B are provided with collars 4 and 8 as shown, the device will offer a favored direction from the standpoint of resistance to axial displacements of the component B in relation to the component A. These components are practically in abutment in the right-to-left direction, even though (in the reverse direction) the resistance possibilities of the component B in relation to the component A are solely a function of consecutive adherence to the deformation created by engagement with component C.

Of course, instead of having planes of symmetry perpendicular to the axis, the grooves or channels could have planes of symmetry parallel to each other but oblique to the axis.

In Fig. 10 there is represented a sleeve variation whose external surface carries alternating grooves 22 and flanges 23 of rounded form, the tops of the flanges and the bottoms of the grooves being of semicircular section and joined to each other (if necessary) by a common tangent.

In the variation of Fig. 11, the grooves 14 and the flanges 15 have a saw-tooth section with peaks and rounded bottoms. This form, upon engagement with the external component, will lead to a disymmetrical flattening of the flanges, which will bend into the adjacent notch, as indicated by broken lines in $15^a$.

Such a solution will effectively operate against the working-out of the rubber component from the external component C, in the direction of the arrow $f^3$. An articulation produced by this type of groove therefore presents a favorable direction (that of the arrow $f^3$), with respect to its resistance to axial displacements of the internal component in relation to the external component. This type may be combined with the use of a collar 4 provided at one or the other end of the rubber sleeve, as in the first example.

Instead of being located in transverse planes, the projections and grooves may be longitudinal and may form (as shown in 17 and 16 of Figs. 12 and 13) true longitudinal channels.

The channels or grooves may again be arranged helicoidally; several helicoidal grooves may be provided and, for example (as shown in Figs. 14 and 15), grooves 18 and 19 crossing one another according to an acute angle (or right) and forming diamond-shaped or square roughnesses or projecting sections 20.

It will be noted that such helicoidal grooves increase adherence to the components B and C by means of a well-known self-tightening phenomenon, particularly when said components oscillate, one in relation to the other.

It will be noted that the effect of longitudinal and/or circular restraint may be accented, as is well-known, by slots arranged circularly or as a helix on the external surface of the sleeve in the hollows, as shown in 22, Fig. 10, and/or on projections as shown in 15, Fig. 11.

One may, of course, combine the various types of grooves or channels shown, or any others, the projections and the hollows being capable of being made of all forms.

Naturally, the invention is not at all limited to the methods of execution shown and described, which have been chosen solely by way of example. The sleeve A may, of course, be replaced by several sleeves arranged one after the other, in contact or otherwise.

I claim:

1. A pivotal connection comprising an outer rigid member having a cylindrical bore and a resilient core co-axial with and disposed within the bore of said outer member and in pressure friction engagement therewith, said core comprising a rigid inner member having intermediate its ends a substantially continuous cylindrical outer surface of uniform diameter throughout, and an annular rubber-like bushing dilated upon said surface of the inner member and completely filling the space between said inner and outer members, with that portion of said bushing contained between said inner and outer members having in the free state a bore diameter less than the outer diameter of the inner member, and having in its dilated state upon the inner member prior to insertion of the core in the outer member a lateral surface made up of alternating projections and recesses, with the maximum diameter taken at the top of said projections being greater than the inner diameter of the outer member and with the minimum diameter at the bottom of the recesses being less than the inner diameter of the outer member.

2. A pivotal connection as in claim 1, in which at at least one end of the cylindrical bore of the outer member there is an abutment surface extending transversely to the axis of the bore, and in which the rubber-like bushing has an integral flange extending outwardly and bearing against said abutment surface.

3. A pivotal connection as in claim 1, in which the diameter of the bore of the outer member is approximately equal to the maximum diameter prior to insertion of the lateral surface of the core less the depth of the recesses on one radius.

4. A pivotal connection as in claim 1, in which that portion of the bushing which in its free state comprises the projections represents only a fractional part of the total wall thickness of the bushing, whereby said bushing in its inserted state in the outer member has a substantial part of its wall thickness in a state of circular tension and has the balance of its wall thickness in a state of reaction to the levelling of the free state lateral surface, said bushing having approximately the same length in both free and inserted states.

References Cited in the file of this patent

UNITED STATES PATENTS

| | | |
|---|---|---|
| 1,786,720 | Moore et al. | Dec. 30, 1930 |
| 2,240,709 | Mead | May 6, 1941 |
| 2,366,860 | Kraft | Jan. 9, 1945 |
| 2,468,311 | TeGrotenhuis | Apr. 26, 1949 |
| 2,468,985 | Krotz | May 3, 1949 |

FOREIGN PATENTS

| | | |
|---|---|---|
| 680,434 | France | Jan. 18, 1930 |